June 14, 1949.  W. J. ALBERSHEIM  2,472,782
WAVE MODIFYING REFLECTOR
Filed Sept. 7, 1945
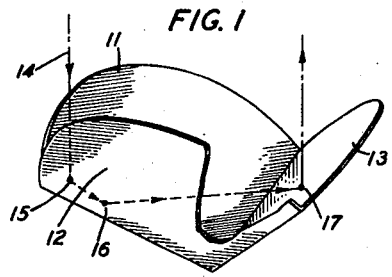
FIG. 1
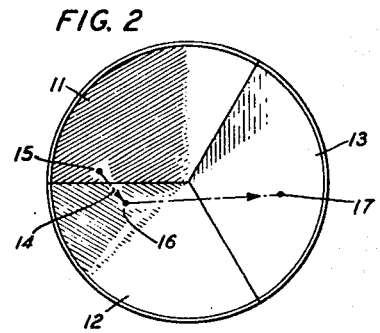
FIG. 2
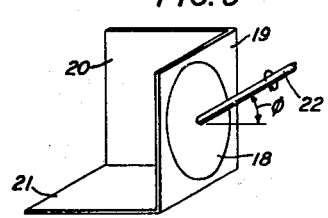
FIG. 3
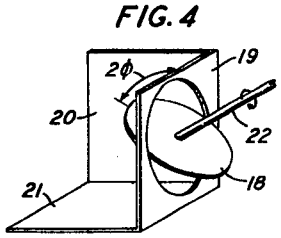
FIG. 4
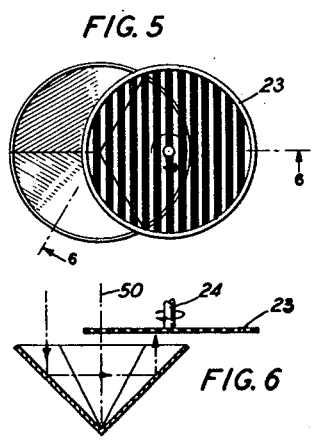
FIG. 5
FIG. 6
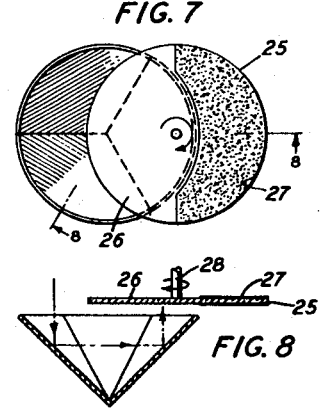
FIG. 7
FIG. 8
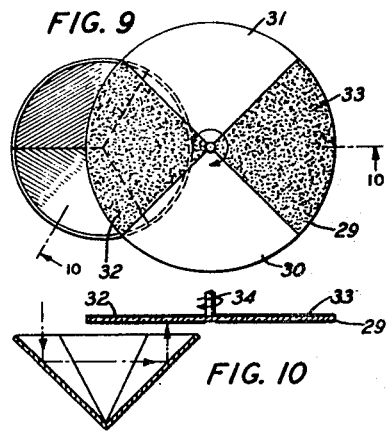
FIG. 9
FIG. 10
INVENTOR
W. J. ALBERSHEIM
BY Franklin Mohr
ATTORNEY Patented June 14, 1949

2,472,782

UNITED STATES PATENT OFFICE 2,472,782

WAVE MODIFYING REFLECTOR

Walter J. Albersheim, Interlaken, N. J., assignor to Bell Telephone Laboratories, Incorporated, New York, N. Y., a corporation of New York Application September 7, 1945, Serial No. 614,938

6 Claims. (Cl. 343—18)

This invention relates to a wave modifying device for electromagnetic waves, comprising a trihedral reflector and means for controlling the reflecting power thereof.

The invention has various uses such as impressing an identifying modulation upon the reflection from a trihedral reflector where employed in the manner of a buoy in the aid of navigation or for modulation of waves reflected back to a direction finding apparatus, such as a radar, to confuse the operator thereof and lead him to assign an incorrect bearing to the location of the reflector.

In the latter example, the device of the present invention may serve as an element in an arrangement such as is disclosed by J. C. Schelleng in a copending application, Serial No. 614,940 filed September 7, 1945, Patent No. 2,443,643, issued June 22, 1948, and assigned to the same assignee as the present application. The Schelleng invention relates to an arrangement to be installed upon a vessel, structure or object, the location of which may be sought to be ascertained by the operator of a direction finding apparatus. The response of the direction finding device is modified by superposed synchronized modulations of the waves reflected from the target, thereby leading the operator to read an incorrect bearing angle for the target.

A trihedral reflector, also known as a corner reflector, comprises three plane reflecting elements mounted in mutually perpendicular relationship to form a trihedral angle. The principal property of a trihedral reflector is that any incident ray, provided it is reflected by each of the three plane elements of the reflector in succession, emerges from the reflector after the third reflection in the direction parallel to its direction of incidence. By virtue of this property a ray incident upon the reflector from any direction may be reflected back toward its source.

Another property of the trihedral reflector is that each ray striking the reflector and reflected successively in the three planar surfaces finally emerges at a point diagonally opposite the point of incidence.

In accordance with the invention, the reflecting properties of a trihedral reflector are varied by means of a rotatable member. For use with linearly polarized waves, the member may comprise a slotted plate or it may comprise a grating of parallel conductors such as rods or wires set in a frame. Where the waves are circularly polarized or, generally, where the waves depart from linear polarization, a shutter composed of sectors alternately of material permeable and material non-permeable to the waves to be reflected may be used, or, in words commonly used in reference to light waves, materials transparent and opaque, respectively, to the waves. As the principal reflecting property of a trihedral reflector depends upon successive reflections from all three planes of the reflector, it is sufficient if one of the plane elements alone has its reflecting properties varied. In this case the rotatable member may operate to modify the reflecting characteristics of only one of the surfaces of the reflector. Again, since each ray striking a trihedral reflector finally emerges at a point diagonally opposite from the point of incidence, all the rays may be affected by a screen or shutter which obstructs or obscures only one half of the aperture of the reflector.

Additional uses beyond those above described will readily occur to persons skilled in the art.

The novel features of the invention are defined in the appended claims and a number of illustrative embodiments of the invention are described hereinafter and shown in the drawings, of which, Fig. 1 is a perspective view, partly broken away, showing a trihedral reflector of circular aperture;

Fig. 2 is an elevational view of the reflector of Fig. 1 as viewed looking toward the aperture along the central axis of the reflector;

Figs. 3 and 4 are perspective views of a trihedral reflector having a rotatable circular portion in one of the elements of the reflector, showing two different positions of the rotatable portion;

Fig. 5 is an elevational view of a trihedral reflector with a rotatable grating having its axis of rotation parallel to the central axis of the reflector and covering a portion of the aperture of the reflector;

Fig. 6 is a cross-sectional view of the device of Fig. 5;

Fig. 7 is an elevational view of a device similar to that shown in Figs. 5 and 6 except that the rotatable grating is replaced by a rotatable shutter which is divided approximately in half, one portion being permeable and the other impermeable to waves to be reflected;

Fig. 8 is a cross-sectional view of the structure of Fig. 7;

Fig. 9 is an elevational view of a trihedral reflector having a shutter similar to that shown in Figs. 7 and 8 except that the shutter has a larger diameter and is divided into four sectors; and, Fig. 10 is a cross-sectional view of the structure of Fig. 9.

The arrangement of Fig. 1 comprises a trihedral reflector having mutually perpendicular substantially planar wave reflecting elements 11, 12 and 13. The free edges of the elements 11, 12 and 13 are cut to the required shape to define for the reflector a circular aperture when viewed along the central axis, which axis is equally inclined to each of the elements. Fig. 2 shows the appearance of the reflector looking directly into the aperture, the central axis being perpendicular to the plane of the drawing. A sample ray is illustrated in Figs. 1 and 2 by a dot-dash line 14, shown as striking the surface 11 at a point 15 and being reflected at surfaces 12 and 13 successively at points 16 and 17 and emerging from the reflector at the point 17 in a direction parallel to the direction of incidence. For simplicity in the drawing, the line 14 represents a ray incident parallel to the central axis of the reflector. It is well known that rays approaching at other angles of incidence will likewise be reflected parallel to themselves. The points of first and last reflection, as 15 and 17 in Figs. 1 and 2 are located diagonally opposite each other and equally distant from the central axis of the reflector.

In accordance with the invention, means are provided in conjunction with the reflector for modifying and controlling its reflecting power. By virtue of the fact that the rays of primary interest are reflected at all three surfaces of the reflector, it is sufficient to place a modifying device solely in one of the surfaces.

Figs. 3 and 4 show a wave modifying device in the form of a rotatable member 18 inserted in the plane of a surface 19 which is one of three reflecting surfaces 19, 20, 21 of a trihedral reflector. The member 18 is adapted to modify the reflecting power of the elementary surface by deflecting the incident rays from the normal path so that they no longer emerge parallel to the direction of original incidence.

With the element 18 in the normal position, as shown in Fig. 3, the three plates 19, 20 and 21 are complete and mutually perpendicular and form the normal or unmodified trihedral reflector. The element 18, preferably circular, is rigidly attached to a shaft 22, the axis of the shaft making an angle with the perpendicular to the plane of the element as indicated by the angle $\phi$ in Fig. 3. Rotation of the shaft 22 causes the element 18 to depart from perpendicularity with respect to the plates 20 and 21, thereby deflecting any beam of radiant energy of appropriate wave length which may be incident upon the element 18 and consequently causing a deflection of the beam as reflected from the trihedral reflector as a whole. Turning the shaft 22 through a half revolution brings the element 18 into the position depicted in Fig. 4, the element 18 being then inclined to the plane of the plate 19 by an angle of 2 $\phi$. Other positions of the shaft correspond to intermediate positions of the element 18 which are not perpendicular to either plate 20 or plate 21.

Other arrangements for varying the reflecting characteristics of a trihedral reflector are shown in subsequent figures of the drawings and are described hereinafter.

By virtue of the fact that a reflected ray emerges from the trihedral reflector at a point diagonally opposite from the point of incidence, the reflecting power of the trihedral reflector may be controlled by means of a grating or shutter covering substantially one-half of the aperture. The grating or shutter is then preferably rotatable about an axis parallel to the central axis of the reflector. Such an arrangement is shown in Figs. 5 and 6 in which a rotatable grating member 23 is mounted upon a shaft 24 extending parallel to the central axis 50 of the reflector. One complete revolution of the grating 23 produces two cycles of maximum and minimum variation in the reflecting power of the reflector.

Figs. 7 and 8 show an arrangement similar to that shown in Figs. 5 and 6 except that the grating 23 is replaced by a shutter 25 comprising a section 26 transparent to the waves and a section 27 opaque to the waves. The shutter 25 is mounted upon a shaft 28 parallel to the central axis of the reflector and may comprise a glass disc having a metallic coating upon one semi-circular portion of its surface. The operation of the arrangement of Figs. 7 and 8 differs from that of the arrangement of Figs. 5 and 6 principally in two respects. First, the shutter 25 is not dependent for its action upon linear polarization of the wave. Circular, elliptical or random polarization are also effective. The second difference is that a complete revolution of the shutter 25 produces only one cycle of variation on the reflecting power of the reflector. The opaque portion 27 may be given a curved outline as shown in Fig. 7 so as to obscure a minimum of the area of the aperture of the reflector when the shutter 25 is in the angular position shown in the figure.

Figs. 9 and 10 show an arrangement similar to that of Figs. 7 and 8 but having a larger shutter 29 comprising four sectors, two of which, 30 and 31 are permeable to the waves and the other two of which 32 and 33 are not. The sectors 30 and 31 alternate with the sectors 32 and 33. The shutter 29 is rotatable upon a shaft 34 which is parallel to the central axis of the trihedral reflector and is located further away from that axis than is the shaft 28 in Figs. 7 and 8. Each of the sectors 30, 31, 32 and 33 is of sufficient size to cover substantially one-half the aperture of the reflector. Because there are four sectors, each revolution of the shutter 29 produces two complete cycles of variation in the reflecting power of the trihedral reflector.

Various modifications of the above embodiments, and also further embodiments within the scope of the appended claims will readily be devised by those skilled in this art. It will be evident that the reflector need not have a circular aperture and many other shapes may be used as well. Due to the skew symmetrical relation existing between the points of incidence and reflection of the rays, the preferred shapes for the aperture are those possessing the same kind of symmetry, that is those for which every point in the reflecting surface there is a corresponding point in the reflecting surface diagonally opposite the first point and equidistant from the central axis of the reflector.

The shutter need not be divided into angularly equal sectors as illustrated in Figs. 7 and 9, nor need the number of sectors be limited to two or four or any certain number. It will be evident that code modulation can be imposed upon the beam by using segments of different angular measure and of any desired number.

What is claimed is:

1. A reflector for radiant energy comprising three planar reflecting elements mounted normally in mutually perpendicular relationship, one of said elements being rotatable through 360 degrees about an axis inclined with respect to the perpendicular to the normal plane of said element.

2. A radiant energy reflector comprising three planar reflecting elements mounted normally in mutually perpendicular relationship to each other, one of said elements being rotatable through 360 degrees about an axis inclined with respect to said rotatable element.

3. A radiant energy reflector comprising three planar reflecting elements, two of which are mounted in fixed perpendicular relationship to each other and the third of which is mounted rotatably through 360 degrees upon an axis which is inclined with respect to a plane that is mutually perpendicular to the planes of said two fixedly mounted planar reflecting elements.

4. A radiant energy reflector comprising three planar reflecting elements, mounted relatively to a set of three mutually perpendicular reference planes, two of said planar elements lying respectively each substantially entirely within a different one of said reference planes, and the third of said planar elements being rotatably mounted at a point in the third of said reference planes and means to rotate said third planar element through 360 degrees about an axis through the point of mounting of said third planar element and inclined to said third reference plane.

5. A radiant energy reflector comprising three planar reflecting elements, mounted in mutually perpendicular relationship, one of said planar reflecting elements having a circular aperture therein, a reflecting disc, movably mounted within said aperture, and means to rotate said disc through 360 degrees about an axis inclined with respect to the plane of said apertured reflecting element, the path of said disc during rotation including a position in which the said disc lies substantially in the plane of said apertured reflecting element.

6. In a radiant energy reflector comprising three planar reflecting elements mounted in mutually perpendicular relationship to each other, one of said elements having an aperture therein, a fourth planar reflecting element having a shaft attached thereto rotatable through 360 degrees, said shaft being inclined with respect to the plane of said fourth planar reflecting element, said fourth element and said shaft being mounted with the shaft making the same angle with the said apertured element as with the said fourth reflecting element and with the point of attachment of said fourth reflecting element to said shaft lying substantially in the plane of said apertured element.

WALTER J. ALBERSHEIM.

REFERENCES CITED

The following references are of record in the file of this patent:

UNITED STATES PATENTS

| Number | Name | Date |
| --- | --- | --- |
| 1,384,014 | Fessenden | July 5, 1921 |
| 1,466,701 | De Forest | Sept. 4, 1923 |
| 1,931,980 | Clavier | Oct. 24, 1933 |
| 2,432,984 | Budenbom | Dec. 23, 1947 |

FOREIGN PATENTS

| Number | Country | Date |
| --- | --- | --- |
| 422,659 | Great Britain | Jan. 16, 1935 |